(12) United States Patent
Hanks

(10) Patent No.: US 7,072,265 B2
(45) Date of Patent: Jul. 4, 2006

(54) LOW COST DETECTION OF WOBBLE INVERSIONS USING A TUNED CIRCUIT

(75) Inventor: D Mitchel Hanks, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/840,027

(22) Filed: May 5, 2004

(65) Prior Publication Data

US 2004/0218506 A1 Nov. 4, 2004

Related U.S. Application Data

(63) Continuation of application No. 09/586,170, filed on Jun. 1, 2000, now Pat. No. 6,798,724.

(51) Int. Cl.
*G11B 7/00* (2006.01)

(52) U.S. Cl. .................. 369/53.34; 369/47.48

(58) Field of Classification Search ............. 369/53.34, 369/47.48; G11B 7/00
See application file for complete search history.

(56) References Cited

U.S. PATENT DOCUMENTS 6,674,705 B1 * 1/2004 Hanks ................... 369/53.34
6,798,724 B1 * 9/2004 Hanks ................... 369/47.1

* cited by examiner

*Primary Examiner*—Aristotelis M. Psitos

(57) ABSTRACT

A tuned circuit is used to detect wobble clock inversions. The tuned circuit reacts to a wobble inversion with a change in amplitude that may be detected by a threshold detector. A bandpass tuned circuit is used to detect wobble clock inversions. The output of the bandpass tuned circuit is input to a saturating high-gain amplifier such as a comparator. The output of the saturating high-gain amplifier reacts to wobble inversions with a half-cycle that has an increased duration as compared to half-cycles without wobble inversions.

5 Claims, 5 Drawing Sheets

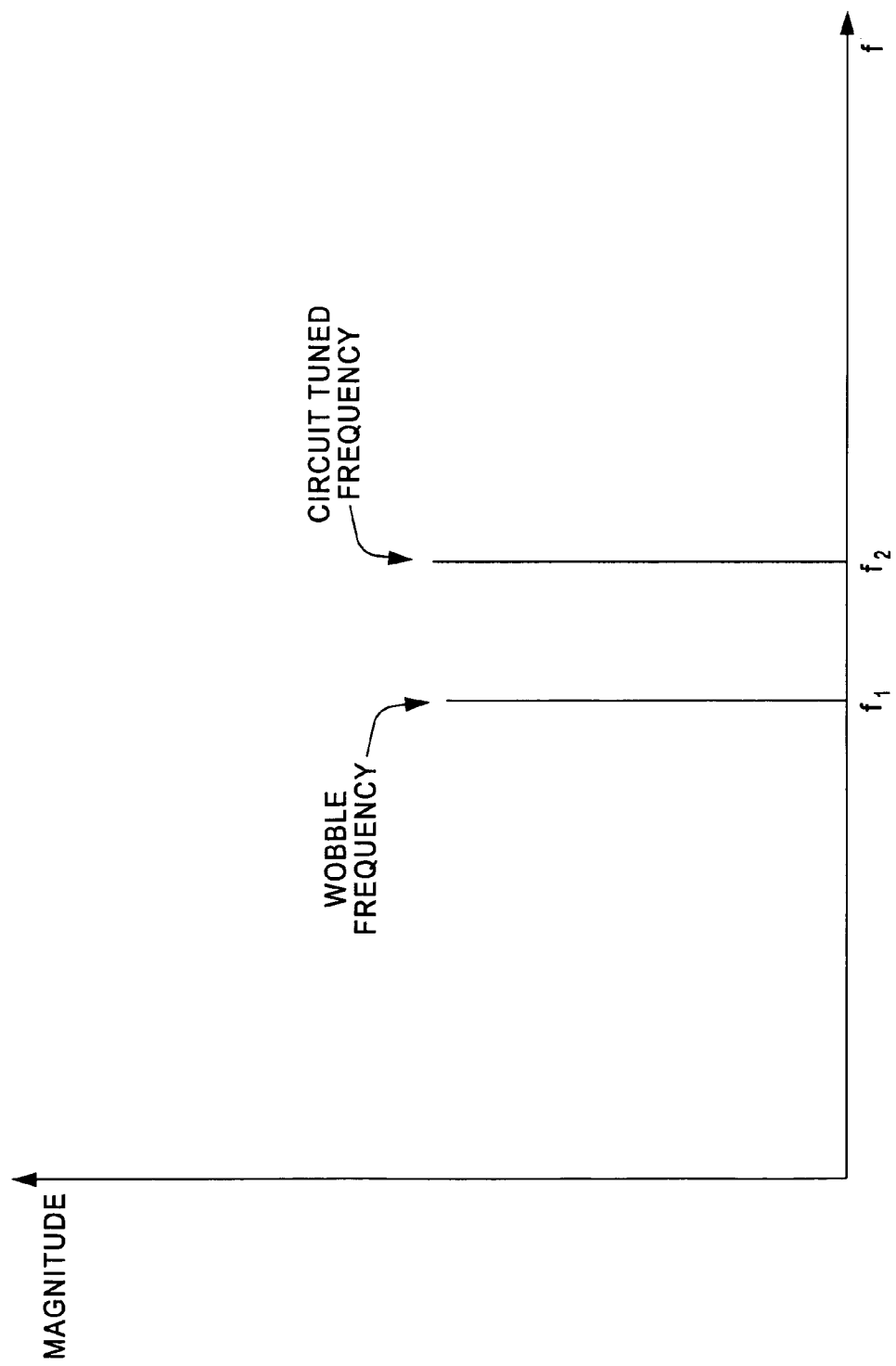

LOW COST DETECTION OF WOBBLE INVERSIONS USING A TUNED CIRCUIT

CROSS REFERENCE TO RELATED APPLICATIONS

This is a continuation of application Ser. No. 09/586,170 filed on Jun. 1, 2000, now U.S. Pat. No. 6,798,724 which is hereby incorporated by reference herein.

A related copending U.S. patent applications commonly owned by the assignee of the present document and incorporated by reference in their entirety into this document is being filed in the United States Patent and Trademark Office on or about the filing date of this application. This application is Hewlett-Packard Company Ser. No. 09/586,173 and is titled "LOW COST DETECTION OF WOBBLE INVERSIONS USING A BANDPASS TUNED CIRCUIT."

FIELD OF THE INVENTION

This invention relates generally to storing data on optical disks. In particular, it relates to detecting digital data written on a clock reference structure formed on a servo track.

BACKGROUND OF THE INVENTION

Some optical disk standards have a permanent clock reference structure formed continuously along servo tracks. This clock reference structure provides a clock reference signal that is generated by an optical transducer as the clock reference structure passes by the optical transducer as the optical disk rotates. One such optical disk standard is called DVD+RW. DVD+RW is specified by the European Computer Manufacturers Association (ECMA) in several standards and draft standards. Many of these standards and draft standards are available at http://www.ecma.ch or by ordering them from ECMA, 114 Rue du Rhône, CH-1024 Geneva, Switzerland. One such draft standard is titles "120 mm ReWriteable DVD (DVD+RW) Capcity: 4.7 Gbytes and 9.4 Gbytes" dated February 1999 which is hereby incorporated herein by reference.

This draft standard specifies that the rewriteable area contain a phase modulated deviation from the nominal centreline called wobble. This wobble provides a permanent clock reference structure and also contains addressing information called Address-in-Pregroove or ADIP. The ADIP data is placed on the track using bi-phase shift keying (BPSK). In other words, a "0" is represented on the disk by a wobble with a first phase angle and a "1" is represented on the disk by a wobble that is 180° different from that first phase angle. The transitions between these two phases are called wobble inversions.

Accordingly, there is a need in the art for a means of detecting wobble inversions. This means should have good noise immunity and not be sensitive to low frequency shifts of the wobble signal. This means should also be inexpensive to produce and require as little circuitry as possible.

SUMMARY OF THE INVENTION

In a preferred embodiment, the invention utilizes a tuned circuit that filters out noise and also generates a transient at the point the wobble inversion occurs. This transient can be cleanly detected to determine the presence of a wobble inversion. The invention is easily tuned to accommodate different wobble frequencies and is well adapted to inexpensive fabrication. The present invention may be implemented as tuned circuit with a natural frequency slightly below the wobble frequency. When a wobble inversion occurs, the tuned circuit reacts by outputting a transient with an amplitude greater than that of the output signal when a wobble inversion does not occur. This transient can be detected by a simple threshold detector.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 5 is a graph showing examples of a wobble frequency and the frequence of the tuned circuit of FIG. 1.

DETAILED DESCRIPTION OF THE PREFERRED EMBODIMENTS

Figure 1:
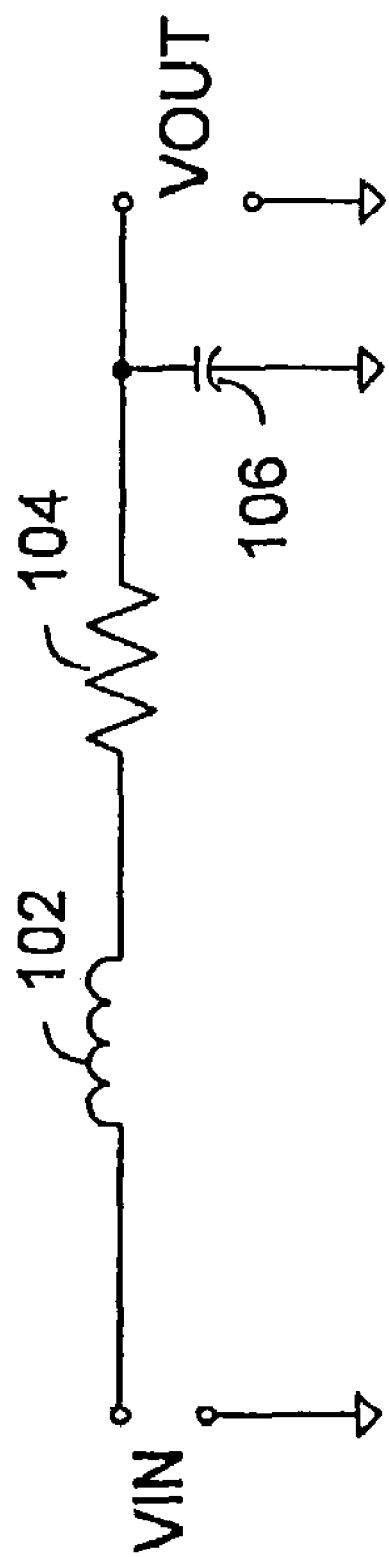
FIG. 1 is a schematic illustration of a tuned circuit suitable for detecting wobble inversions.

FIG. 1 is a schematic illustration of a tuned circuit suitable for detecting wobble inversions. In FIG. 1, the input is shown as VIN. VIN is referenced to a common node. VIN is applied to a first terminal of inductor 102. The second terminal of inductor 102 is connected to a first terminal of resistor 104. The second terminal of resistor 104 is connected to a first terminal of capacitor 106. The second terminal of capacitor 106 is connected to the common node. The output of the tuned circuit of FIG. 1 is shown as VOUT. VOUT is measured between the common node and the first terminal of capacitor 106.

In the preferred embodiment, the values of inductor 102, resistor 104, and capacitor 106 are chosen so that the circuit has a natural frequency marginally below the wobble frequency. For example, for an input wobble signal with a monotone wobble frequency of 265 kHz, the values of the components in the tuned circuit may be chosen so that the natural frequency of the tuned circuit is 112 kHz and the damping factor of the tuned circuit is around 0.71 (critically damped).

Figure 2:
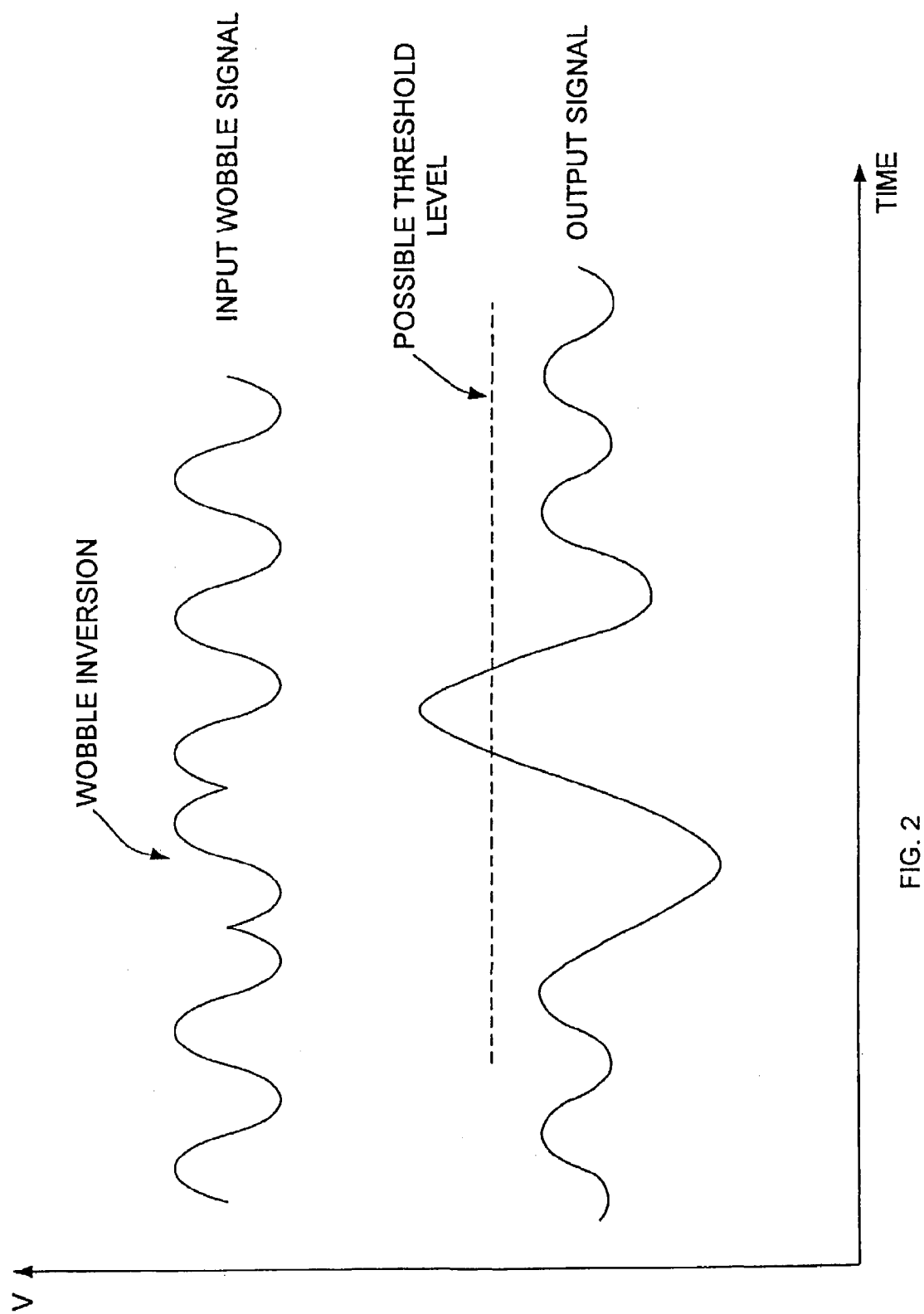
FIG. 2 is an illustration of an input wobble signal with a wobble inversion and an output signal from a tuned circuit.

FIG. 2 is an illustration of an input wobble signal with a wobble inversion and an output signal from a tuned circuit like that in FIG. 1. As can be seen in FIG. 2, the output signal responds to a wobble inversion in the input wobble signal with a change in amplitude. This change in amplitude may be detected by a threshold detector or a comparator. This change in amplitude may be either an increase in amplitude or a decrease in amplitude. Also shown in FIG. 2 is a possible threshold voltage level that may be chosen to detect wobble inversions as indicated by an increase in amplitude on the output signal.

It should be noted that there is considerable leeway in choosing the values of the components in the tuned circuit. For example, if the natural frequency of the tuned circuit is halved, the tuned circuit will still produce a pronounced response to wobble inversions.

Figure 3:
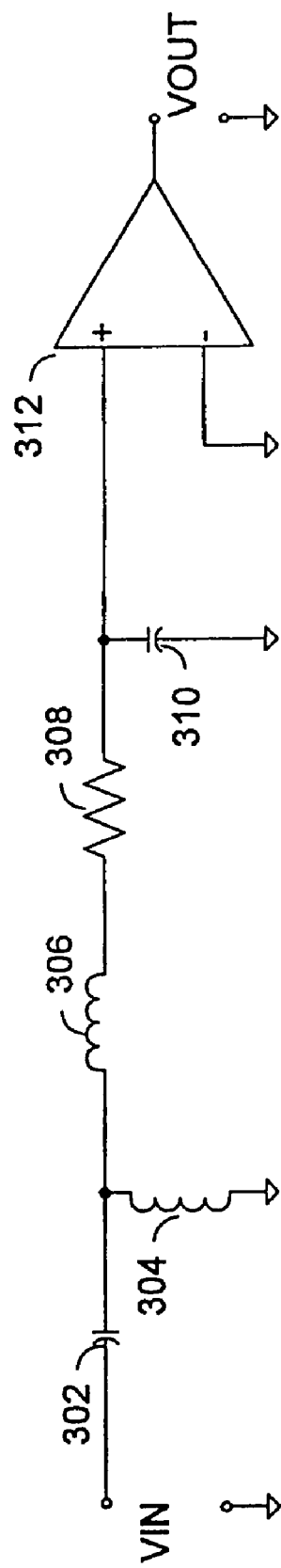
FIG. 3 is a schematic illustration of a comparator fed by a bandpass tuned circuit suitable for detecting wobble inversions.

FIG. 3 is a schematic illustration of a comparator fed by a bandpass tuned circuit suitable for detecting wobble inversions. In FIG. 3, the input is shown as VIN. VIN is referenced to a common node. VIN is applied to a first terminal of capacitor 302. The second terminal of capacitor 302 is connected to a first terminal of inductor 304 and a first terminal of inductor 306. The second terminal of inductor 304 is connected to the common node. The second terminal of inductor 306 is connected to a first terminal of resistor 308. The second terminal of resistor 308 is connected to a first terminal of capacitor 310 and the non-inverting input of comparator 312. The second terminal of capacitor 310 is connected to the common node. The inverting input of comparator 312 is connected to the common node. The output of comparator 312 is VOUT. VOUT is referenced to the common node.

In the preferred embodiment, the values of capacitors 302 and 310, inductors 304 and 306, and resistor 308 are chosen to minimize low frequency and high frequency noise. The comparator processes the signal so as to make a distiction between wobble inversions and regular wobbles. This is shown in FIG. 4.

Figure 4:
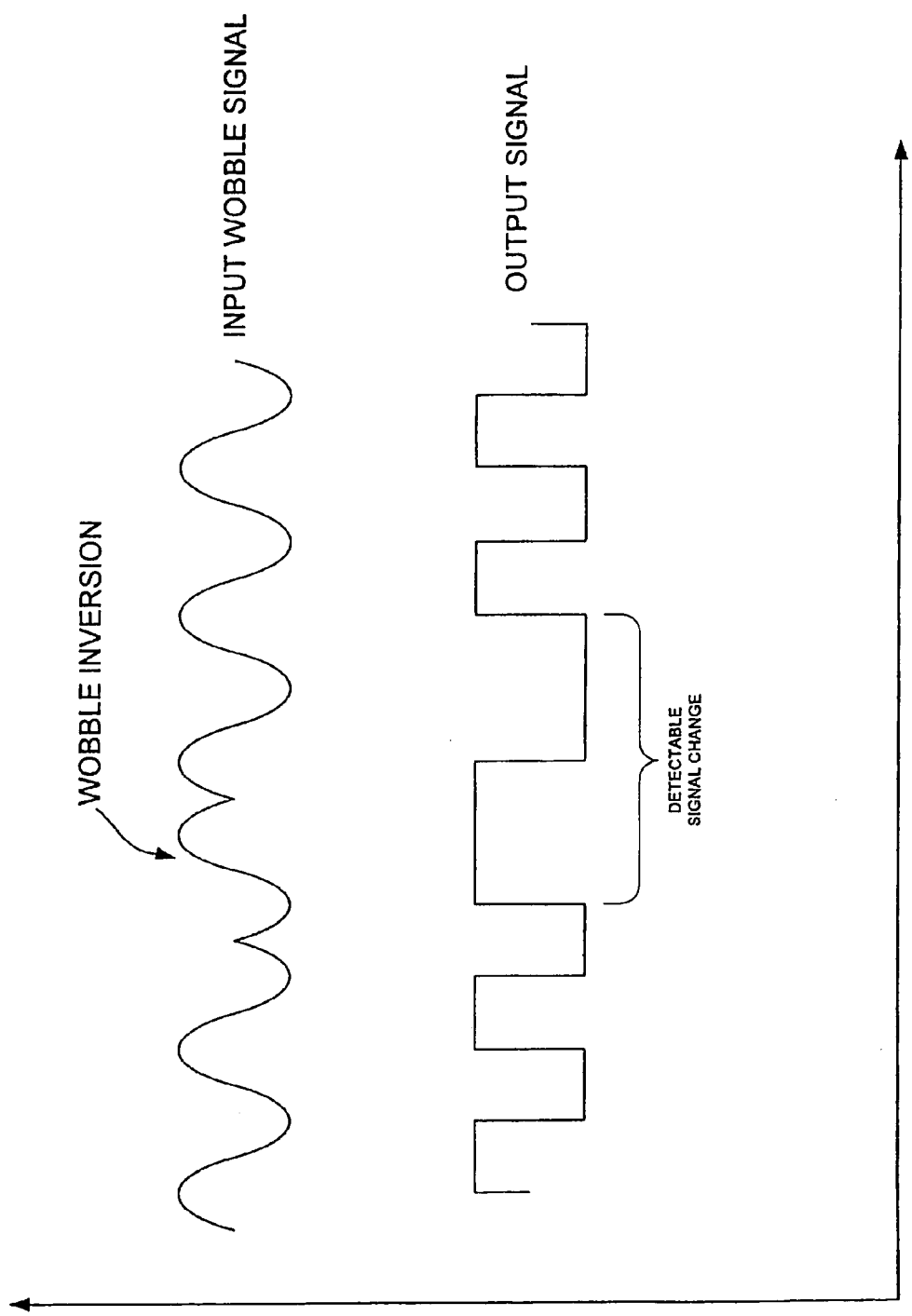
FIG. 4 is an illustration of an input wobble signal with a wobble inversion and an output signal from a comparator fed by a bandpass tuned circuit.

FIG. 4 is an illustration of an input wobble signal with a wobble inversion and an output signal from a comparator fed by a bandpass tuned circuit. As can be seen in FIG. 4, the output signal responds to a wobble inversion in the input wobble signal with at least one half-cycle that has an increased duration. This half-cycle of increased duration may be detected a number of ways including detecting a polarity difference from an expected value when the output signal is regularly sampled.

FIG. 5 is a graph showing examples of a wobble frequency and the frequency of the tuned circuit of FIG. 1. As shown in FIG. 5, the circuit is tuned to a frequency of $f_2$ and the wobble frequency is a frequency of $f_1$, wherein $f_1$ is less than $f_2$. The wobble frequency is not the frequency of the tuned circuit. In some embodiments, the frequency $f_1$ is within an octave of the frequency $f_2$.

Although several specific embodiments of the invention have been described and illustrated, the invention is not to be limited to the specific forms or arrangements of parts so described and illustrated. The invention is limited only by the claims.

What is claimed is:

1. A wobble inversion detector for detecting wobble inversions in a wobble signal, said wobble signal having a wobble frequency associated therewith, said detector comprising:
    a circuit having an input and an output, said circuit being tuned to a frequency that is different than the frequency of said wobble signal;
    wherein said input is connectable to a source of said wobble signal; and
    wherein the voltage at said output changes in amplitude when a wobble inversion occurs on said wobble signal, said change in amplitude being indicative of a wobble inversion.

2. The wobble inversion detector of claim 1 wherein said wobble signal has a monotone wobble frequency and said circuit is tuned at a frequency that is less than said monotone wobble frequency.

3. The wobble inversion detector of claim 2 wherein said circuit comprises:
    an inductance in series with a resistance between said input and said output; and,
    a capacitance connected between said output to a common node.

4. The wobble inversion detector of claim 1 further comprising a threshold detector coupled to said output that detects said changes in amplitude.

5. The wobble inversion detector of claim 1, wherein said circuit is tuned to a frequency that is within an octave of said wobble frequency, but not at said wobble frequency.

* * * * *